(12) United States Patent
Matsumoto

(10) Patent No.: US 6,278,207 B1
(45) Date of Patent: Aug. 21, 2001

(54) BLOWER

(75) Inventor: Kaoru Matsumoto, Kitasaku-gun (JP)

(73) Assignee: Minebea Co., Ltd., Nagano-Ken (JP)

(*) Notice: Subject to any disclaimer, the term of this patent is extended or adjusted under 35 U.S.C. 154(b) by 0 days.

(21) Appl. No.: 09/562,768

(22) Filed: May 2, 2000

(30) Foreign Application Priority Data

Dec. 24, 1999 (JP) .................................................. 11-367527

(51) Int. Cl.⁷ .............................. H02K 5/10; H02K 29/00
(52) U.S. Cl. ............................................. 310/88; 310/68 R
(58) Field of Search ................................ 310/88, 89, 90, 310/68 R

(56) References Cited

U.S. PATENT DOCUMENTS 5,786,648 * 7/1998 Iwanami ................................. 310/90

* cited by examiner

Primary Examiner—Nestor Ramirez
Assistant Examiner—Judson H. Jones
(74) Attorney, Agent, or Firm—Oliff & Berridge, PLC

(57) ABSTRACT

To improve dust-proof and drip/water-proof characteristics of a blower. In a blower constructed by forming a bearing housing (4) at the center of a tubular casing (1), supporting a shaft (7) with bearings (5), (6) that are supported with the bearing housing, attaching an impeller (9), a motor yoke (12), etc., to the shaft (7), and arranging a stator core (17) inside the motor yoke (12), one end of the bearing housing (4) is elongated to form therein a chamber (21), and a PC board (18) is housed in the chamber (21). A connection terminal (19) projected from the stator coil (16) is connected to electronic circuits mounted on the PC board (18), and an opening of the chamber (21) is covered with a lid plate (22). The PC board (18) is thus surrounded by the chamber (21), so that it is protected from dust and water.

3 Claims, 5 Drawing Sheets

BLOWER

BACKGROUND OF THE INVENTION

1. Field of the Invention

The present invention relates to a improved blower for use in a variety of OA (office automation) equipment.

2. Description of the Related Art

Each OA equipment houses many electronic circuits within its casing, so that the heat generated by electronic parts constituting those electronic circuits are hard to be discharged. Because of this, there is a fear that some of the electronic parts are broken or deteriorated. Particularly in view of the recent trend towards downsizing of the OA equipment, in which the equipment is simply reduced in size despite the absence of significant reduction in quality of the generated heat, countermeasures against the heat has come to an important technical object. Then troubles that would be caused by heat generated inside is prevented by forming a ventilation hole on a side wall of the equipment and mounting a blower around the hole to discharge the internal heat to the outside of the equipment.

An example of a blower that has been frequently used will now be described with reference to FIG. 3. Reference symbol 1 denotes a tubular casing the inside of which is sloped to form a venturi portion 2. A housing 3 is formed integrally with this casing 1 at the center. A bearing housing 4 is formed on the central portion of the housing. Outer races of bearings 5 and 6 are supported inside the bearing housing 4 and a shaft 7 is fitted and inserted to inner races of the bearings 5 and 6. A ring 8 is mounted at the lower end of the shaft 7 to prevent thereby the shaft 7 from being pulled out and position the shaft 7 in the axial direction.

Reference symbol 9 denotes an impeller made of synthetic resins. This impeller 9 comprises a body 10 having in section a shape of letter C and blades 11 formed around the periphery of the body 10, which are integrally formed. In forming the impeller 9, a ring-shaped motor yoke 12 is insert-molded at the inner circumferential portion of the body 10 and the shaft 7 is insert-molded at the central portion of the body 10. A knurling groove 13 is formed near the top end of the shaft 7 so that the shaft 7 is tightly joined to the body 10 at the time of the insert molding, preventing separation from the body 10 during rotation. A ring-shaped magnet 14 is fixed by adhesives to the inner circumference of the motor yoke 12. These parts together form a rotary part. A ring-shaped spring 15 is interposed between a portion of the body 10 near the shaft 7 and the inner race of the bearing 5, which gives the impeller 9 an upward pressurization in the drawing.

A stator core 17 around which a stator coil 16 is coiled is arranged on the outside of the bearing housing 4 and fixed to the bearing housing 4 to form a stationary part. A PC (printed circuit) board 18 on which electronic circuits as a brushless motor are formed from electronic parts is mounted on a lower portion of the stator core 17. The electronic circuits incorporated into this PC board 18 control current for rotating the rotary part relative to the stationary part. A pin-like connecting terminal 19 is projected downward from the stator core 17 to pierce through a part of the PC board 18, thereby electrically connecting the stator coil 16 to the circuits on the PC board 18. A lead 20 is connected to the PC board 18 for feeding electric power to the PC board 18.

The thus constructed blower is used when mounted around the ventilation hole of the casing of the OA equipment. In the mounting work, the upper side of the blower in the drawing is directed to the outside of the box of the OA equipment with the shaft 7 being directed in the horizontal direction. When a predetermined voltage is fed from a power source to the lead 20 under this condition, the current controlled by a control circuit on the PC board 18 is caused to flow through the stator coil 16 so that the rotary part is rotated by a magnetic interference action between the magnetic flux generated in the stator core 17 and the magnetic flux generated by the magnet 14. The impeller 9 is rotated so that the air in the lower part of the box in the drawing is sucked and is discharged from the venturi portion 2 toward the outside in the upper part in the drawing. With this air flow operation, the interior of the casing is cooled.

The blower with the above structure has no problem when adopted by equipment used in a usual office. However, the PC board in the blower is not completely covered, which makes the blower unsuitable for use under severe circumstances such as construction sites especially in terms of dust-proof and drip/water-proof characteristics.

SUMMARY OF THE INVENTION

The present invention has been made in view of the above, and an object of the present invention is therefore to provide a blower that is suitable for use in severe circumstances.

In order to attain the above object, according to a first aspect of the present invention, there is provided a blower constructed by forming a bearing housing at the center of a tubular casing, supporting a shaft with bearings that are supported by the bearing housing, attaching a impeller, a motor yoke, etc., to the shaft, and arranging a stator core with a stator coil wound thereabout inside the motor yoke, the blower characterized in that one end of the bearing housing is elongated and expanded to form a shape of letter C, a chamber formed within the C-shaped portion houses a PC board with a control circuit mounted thereon, a connection terminal projected from the stator coil is connected to electronic circuits mounted on the PC board, and a opening of the chamber is covered with a lid plate. Incidentally, the "blower" referred to herein means an axial flow fan motor and a centrifugal fan motor, and the centrifugal fan motor further includes a blower, a cross-flow type and motor impellized type.

Also, according to a second aspect of the present invention, the blower in the first aspect of the invention is characterized in that the entire outer peripheral portion of the stator coil and the stator core is coated with synthetic resins, and the coating is partially removed to expose solely the connection terminal connected to the electronic circuits on the PC board and to fit and fix the connection terminal to the PC board.

Furthermore, according to a third aspect of the present invention, the blower in the first aspect of the invention is characterized in that the entire peripheral portion of the stator coil and the stator core is coated with synthetic resins, the coating is partially removed to expose solely the connection terminal connected to the electronic circuits on the PC board and to fit and fix the connection terminal to the PC board, and a filler is injected in the interior of a chamber that houses the PC board.

With the structure according to each aspect of the present invention, the PC board is housed within the chamber and is covered by the lid plate and, furthermore, the filler tightly seals the chamber. The PC board is thus protected from dust, moisture, oil, etc.

DESCRIPTION OF THE PREFERRED EMBODIMENTS

Figure 1:
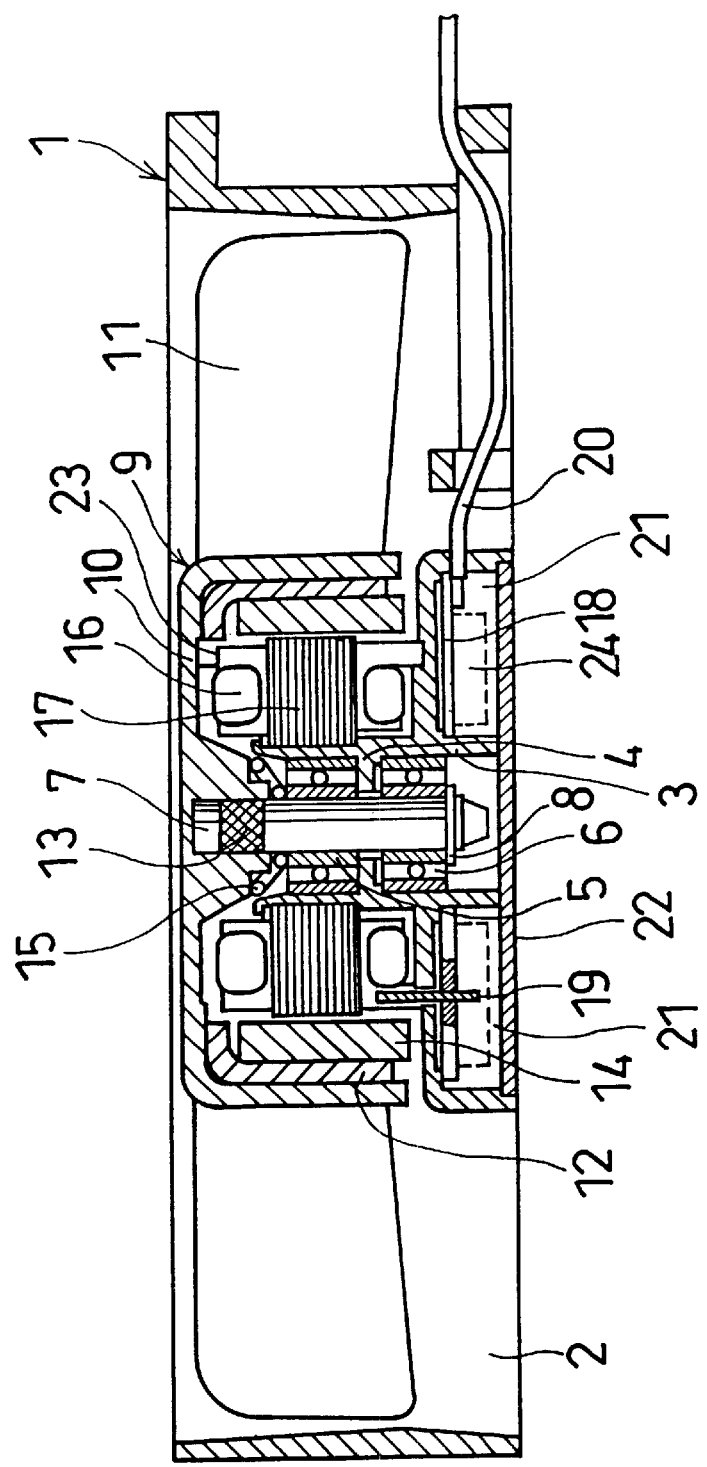
FIG. 1 is a vertically sectional view showing a blower according to a embodiment of the present invention.

Hereinafter, an embodiment of the present invention will be described with reference to FIG. 1. Reference symbol 1 denotes a tubular casing the inside of which is sloped to form a venturi portion 2. A housing 3 is molded integrally with this casing 1 at the center. A bearing housing 4 is molded at the central portion of the housing. Outer races of bearings 6 and 6 are supported inside the bearing housing 4 and a shaft 7 is fitted and inserted in inner races of the bearings 5 and 6. A ring 8 is mounted at the lower end of the shaft 7 to thereby prevent the shaft 7 from being pulled out and adapted to position the shaft 7 in the axial direction.

Reference symbol 9 denotes an impeller made of synthetic resins. This impeller 9 comprises a body 10 having in section a shape of letter C and blades 11 formed around the periphery of the body 10 integrally. In molding the impeller 9, a ring-shaped motor yoke 12 is insert-molded at the inner circumferential portion of the body 10 and the shaft 7 is insert-molded at the central portion of the body 10. A knurling groove 13 is formed near the top end of the shaft 7 so that the shaft 7 is tightly joined to the body 10 at the time of insert-molding to prevent it from being separated from the body 10 during rotation. A ring-shaped magnet 14 is fixed by adhesives to the inner circumference of the motor yoke 12. These parts together form a rotary part. A ring-shaped spring 15 is interposed between a portion of the body 10 near the shaft 7 and the inner race of the bearing 5, which gives the impeller 9 a pressurization upward in the drawing.

A stator core 17 around which a stator coil 16 is coiled is arranged on the outside of the bearing housing 4 and fixed to the bearing housing 4 to form a stationary part. A PC board 18 on which electronic circuits as a brushless motor formed from electronic parts are formed is mounted on a lower portion of the stator core 17. The electronic circuits incorporated into this PC board 18 control current for rotating the rotary part relative to the stationary part. A pin-like connecting terminal 19 is projected downward from the stator core 17 to pierce through a part of the PC board 18, thereby electrically connecting the stator coil 16 to the circuits on the PC board 18. A lead 20 is connected to the PC board 18 for feeding electric power to the PC board 18.

The above description is about the structure shared between the blower of the present invention and the conventional ones. According to the first aspect of the present invention, one end of the bearing housing 4 is elongated and expanded to form a shape of letter C, a chamber 21 formed within the C-shaped portion houses the PC board 18, a connection terminal 19 projected from the stator coil 16 is connected electrically to the electronic circuits mounted on the PC board 18, and a opening of the chamber 21 is covered with a lid plate 22.

Figure 2:
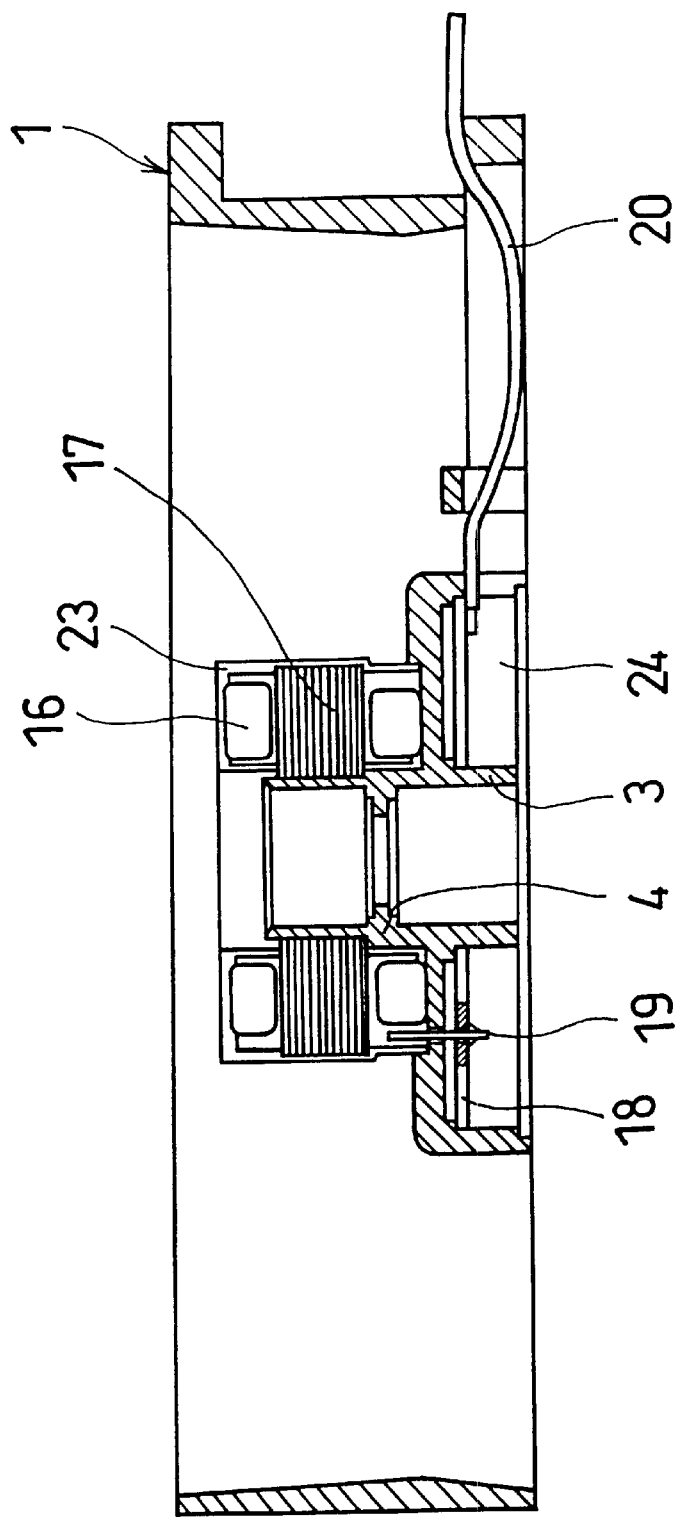
FIG. 2 is an enlarged view showing a main part of FIG. 1 vertically in section.
Figure 3:
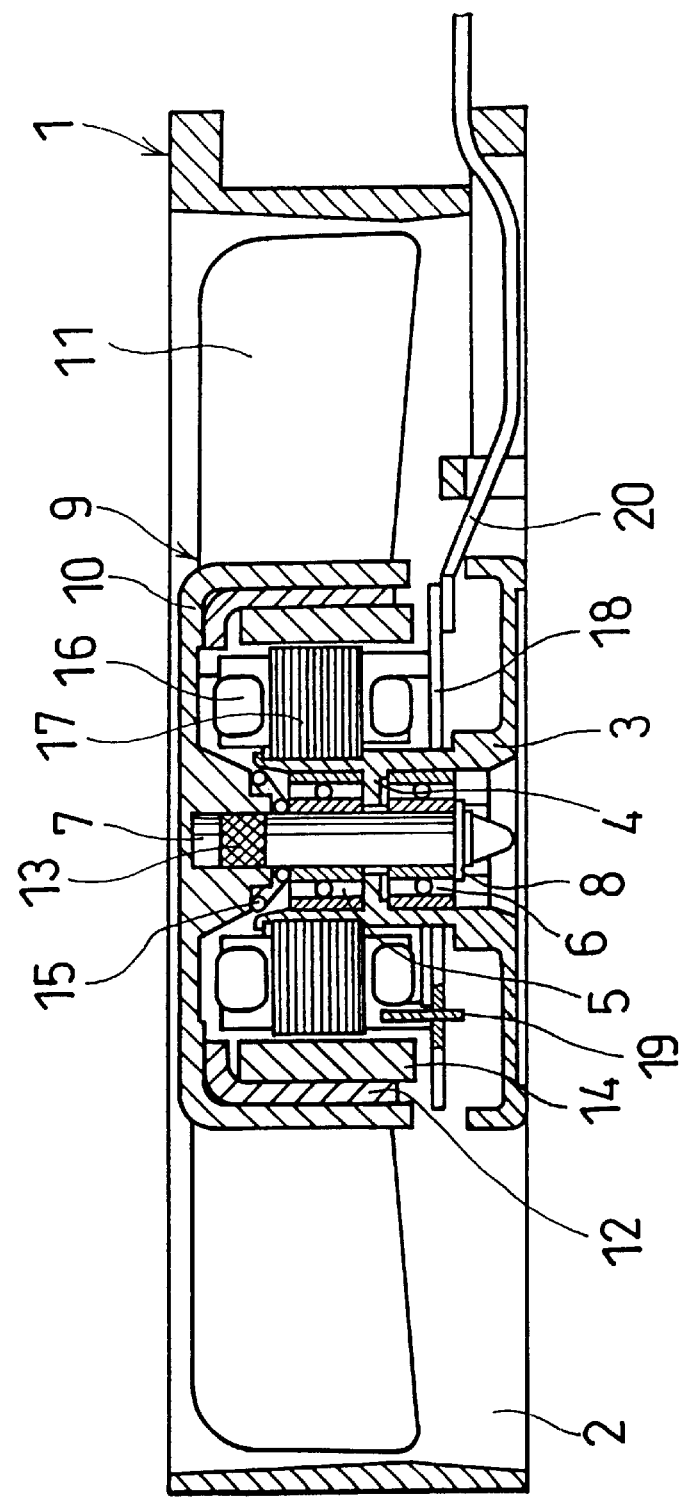
FIG. 3 is a vertically sectional view showing a conventional blower.

Referring now to FIG. 2, which is an enlarged view showing the main part of FIG. 1, the second and third aspects of the present invention will be described. First, according to the second aspect of the invention, the entire outer peripheral portion of the stator coil 16 and the stator core 17 is coated with synthetic resins 23, and the coating is partially removed to expose solely the connection terminal 19 connected to the electronic circuits on the PC board 18 and to fit and fix the connection terminal to the PC board 18. According to the third aspect of the invention, a filler 24 is injected to the interior of the chamber 21 that houses the PC board 18, in addition to the structure of the second aspect of the invention. With these structures, the coating made of synthetic resins 23 improves the dust-proof and drip/water proof characteristics of the stator coil 16 and the stator core 17, and the injection of the filler 24 also improves the dust-proof and drip/water proof characteristics of the PC board 18 and the connection terminal 19.

Figure 4:
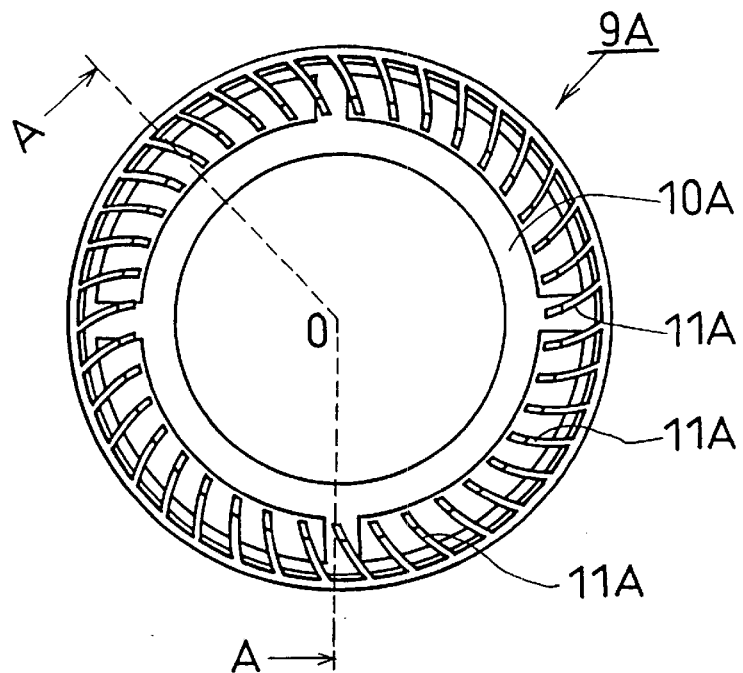
FIG. 4 is a front view of a separately shown impeller that has a different structure.
Figure 5:
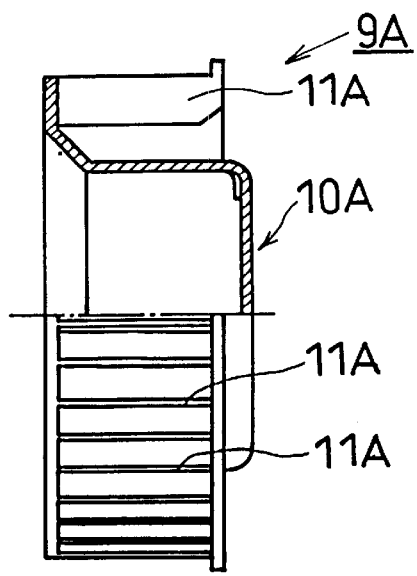
FIG. 5 is a side view of an impeller partially in section along a line O-A in FIG. 4.

The present invention may also be applied to a blower that uses an impeller having the structure different from the one described above. An example thereof will be described with reference to FIGS. 4 and 5. FIG. 4 shows the entirety of an impeller 9A and FIG. 5 is a half-sectional view showing a part of the impeller 9A taken along the line O-A in FIG. 4. This impeller 9A is provided with a number of arched blades 11A mounted radially on its body 10A.

Figure 6:
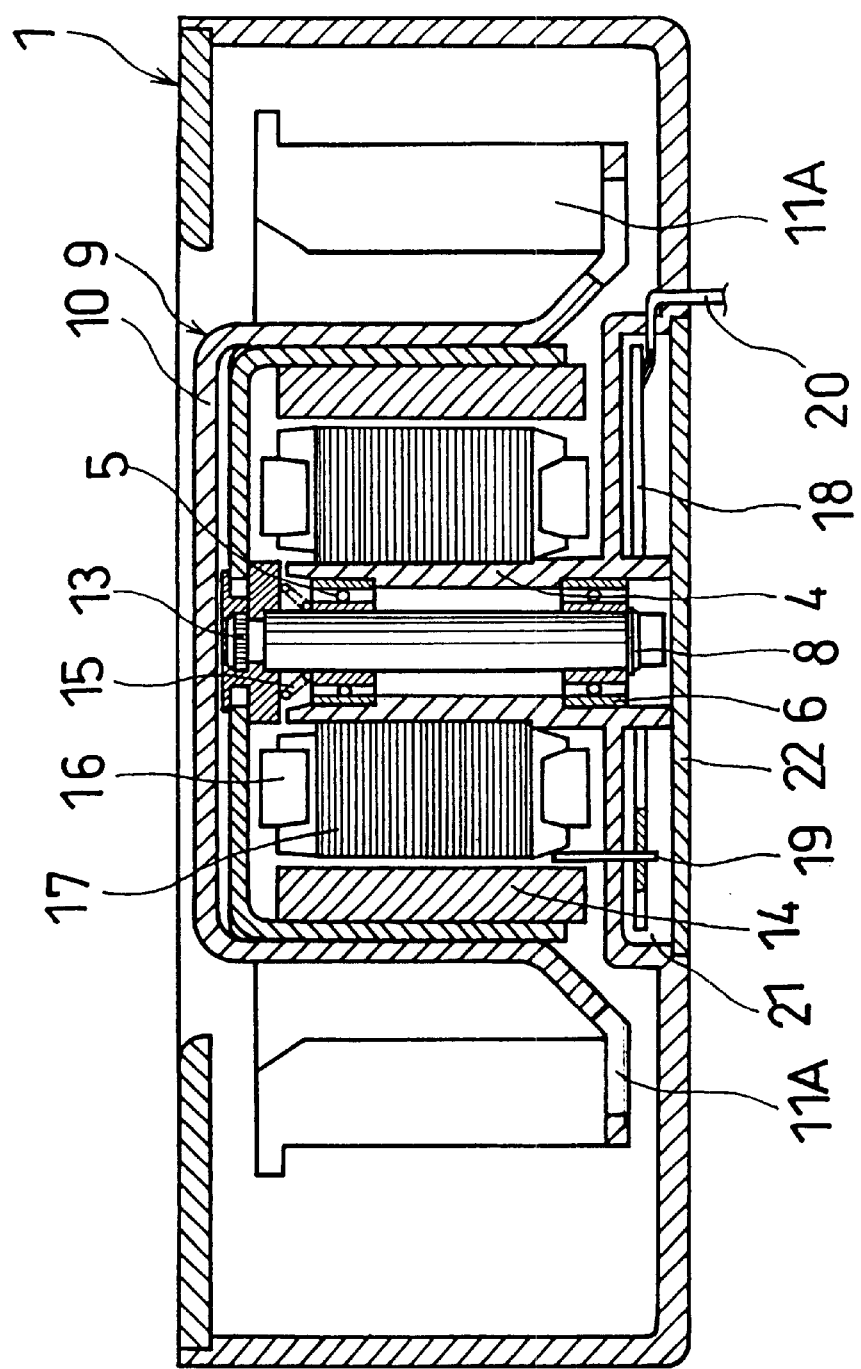
FIG. 6 is a vertically sectional view showing an embodiment of the blower in which the impeller of FIG. 4 is used.

FIG. 6 shows a blower using this impeller 9A. The same reference symbols as in FIG. 1 are used to indicate the like portions. In such an impeller also, one end of the bearing housing 4 is elongated and expanded to form a shape of letter C, a chamber 21 formed within the C-shaped portion houses the PC board 18 with a control circuit mounted thereon, a connection terminal 19 projected from the stator coil 16 is connected to the electronic circuits mounted on the PC board, and a opening of the chamber 21 is covered with a lid plate 22. According to the present invention, the blower having such structure may also protect its PC board from dust or water.

The arrangement of the blower has been described above. Therefore, according to the first aspect of the invention, the PC board ca be protected from dust or water by means of the chamber formed by elongating one end of the bearing housing. According to the second aspect of the present invention, the stator coil and the stator core can be protected by the synthetic resin coating. According to the third aspect of the invention, in addition to the effect of the second aspect of the invention, the filler can enhance the protection of the PC board.

What is claimed is:

1. A blower comprising a bearing housing at the center of a tubular casing, a shaft supported with bearings that are supported by said bearing housing, having an impeller, a motor yoke, and a stator core wound with a stator coil inside said motor yoke, wherein one end of said bearing housing is elongated and expanded to form a shape of letter C, a chamber formed within the C-shaped portion houses a PC board mounted with a control circuit, a connection terminal projected from said stator coil is connected to electronic circuits mounted on said PC board, and a opening of said chamber is covered with a lid plate.

2. The blower according to claim 1, wherein the entire peripheral portion of said stator coil and said stator core is coated with synthetic resins, and the coating is partially removed to expose solely said connection terminal connected to the electronic circuits on said PC board and to fit and fix said connection terminal to said PC board.

3. The blower according to claim 1, wherein the entire outer peripheral portion of said stator coil and said stator core is coated with synthetic resins, the coating is partially removed to expose solely said connection terminal connected to the electronic circuits on said PC board and to fit and fix said connection terminal to said PC board, and a filler is injected to the interior of said chamber that houses said PC board.

* * * * *